United States Patent

[11] 3,568,086

[72] Inventor Kenneth E. Perry
Wayland, Mass.
[21] Appl. No. 828,930
[22] Filed May 29, 1969
[45] Patented Mar. 2, 1971
[73] Assignee EG & G International, Inc.
Bedford, Mass.

[54] OSCILLATOR SYSTEM
6 Claims, 2 Drawing Figs.

[52] U.S. Cl. ........................................................ 331/65,
331/143, 331/177
[51] Int. Cl. ........................................................ G01n 27/18
[50] Field of Search ............................................ 331/65, 66,
111, 143, 177, 181

[56] References Cited

OTHER REFERENCES

Stewart, " Linear VCO Generates Sawtooth and Square Waveforms" EEE June 1968 p. 119 331— 177

*Primary Examiner*—Roy Lake
*Assistant Examiner*—James B. Mullins
*Attorneys*—Ralph L. Cadwallader and Lawrence P. Benjamin

ABSTRACT: An oscillator system embodying a zero-crossing detector and a ramp generator, the combination connected to provide either a frequency or a period measurement that varies substantially proportionally with the setting of a sensor or other attenuating device.

PATENTED MAR 2 1971 3,568,086

KENNETH E. PERRY
INVENTOR
BY
ATTORNEYS

OSCILLATOR SYSTEM

BACKGROUND OF THE INVENTION

This invention relates to oscillator circuits and is more particularly directed to oscillator circuits in which it is desired to vary the frequency or period of the oscillation under control of some sensing or transducing device utilizing a minumum number of frequency-determining electrical components, preferably, a single energy-storing element.

In my prior U.S. Pat. No. 3,295,069, entitled "Oscillation Generator Embodying Complimentary Differential Amplifier Pairs," which issued on Dec. 27, 1966, and is assigned to the assignee of the subject application, there is described therein an oscillator utilizing bistable switching elements and a single frequency-determining network. While this circuit has been found to perform quite admirably in practice, there are certain instances in which it is not desired to utilize such switching circuits and where it may be more desirable or advantageous to have somewhat greater flexibility both in the choice of transducers as well as having the availability of either the frequency or the period of operation proportional to variations appearing in the sensor element. Further, since the bistable switching circuits in my above-mentioned patent are relatively low-gain devices, the frequency stability may be somewhat more limited than desired.

SUMMARY OF THE INVENTION

The present invention provides a novel circuit configuration utilizing the combination of zero-crossing detector means together with a ramp generator means, preferably, embodying high-gain operational amplifiers, so as to enable a sensor or other signal-attenuating means to control selectively either the frequency or the period of an oscillator, in accordance with variations in the sensor.

It is, therefore, one object of the present invention to provide a new and improved oscillator circuit of the above-described character that is not subject to the difficulties of the prior art.

Another object of the present invention is to provide a novel oscillator circuit configuration utilizing a zero-crossing detector in combination with a ramp generator, the combination being noted by its higher stability than heretofore obtained.

Still another object of the present invention is to provide a novel oscillator circuit configuration utilizing a zero-crossing detector in combination with a ramp generator, the combination being noted by its higher stability than heretofore possible wherein a single energy-storing element is included.

Yet another object of the present invention is to provide a novel oscillator circuit configuration utilizing a zero-crossing detector in combination with a ramp generator to drive a sensor element which element controls selectively the frequency or period of the oscillation in accordance with variations in the sensor element, the combination being noted by its higher stability than heretofore possible.

The features of my invention which I believe to be novel are set forth with particularity in the appended claims. The invention itself, however, both as to its organization and method of operation, together with further objects and advantages thereof, may best be understood by reference to the following description of the preferred embodiment taken in conjunction with the accompanying drawings.

DETAILED DESCRIPTION OF THE PREFERRED EMBODIMENT

Figure 1:
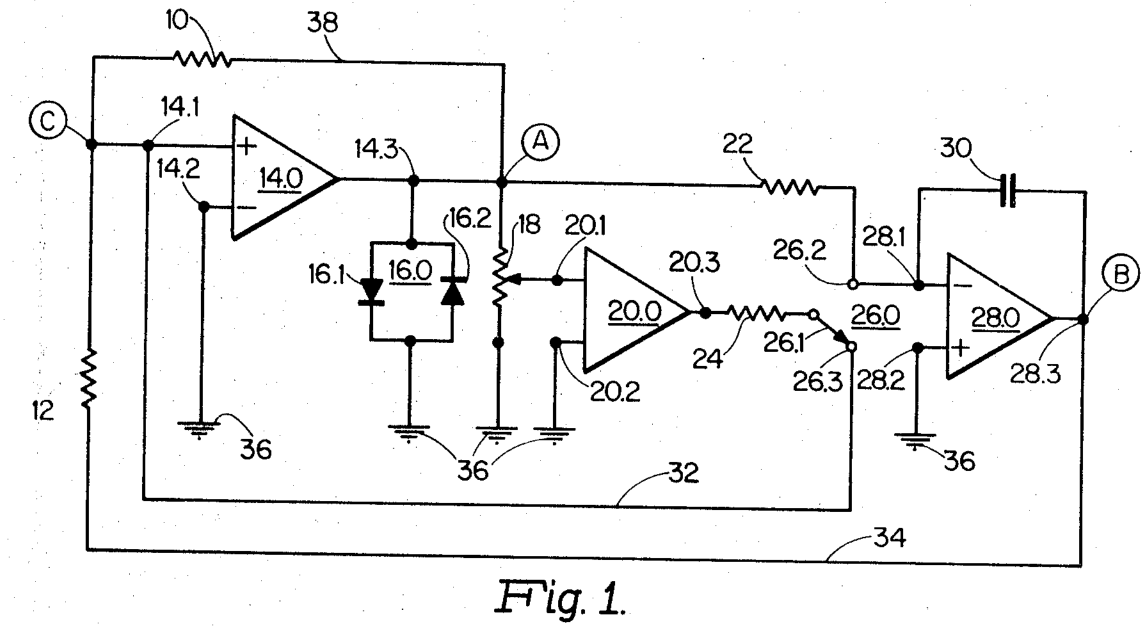
FIG. 1 is a circuit diagram of one embodiment of my invention in which a zero-crossing detector is combined with a ramp generator to provide my novel oscillator circuit configuration.

Referring now to the drawings, it is shown, in FIG. 1, a relatively inexpensive, commercially available operational amplifier 14.0 (such as, for example, DC Comparator model H8020A, manufactured by Union Carbide Electronics) connected in such a manner as to be operated as a overdriven operational amplifier having a high-gain and fast response with a high input impedance and low output current, low-offset voltage error. As such, amplifier 14.0 acts as a zero-crossing detector responsive to the input voltage thereto. Thus, as the input voltage applied to terminals 14.1—14.2 passes through zero a concurrent output signal will appear between terminals 14.3 and ground 36 as will hereinafter be described. It should be here noted that one output terminal and input 14.2 of zero-crossing detector 14.0 may be at ground potential.

A positive feedback path 38 is connected between output terminal 14.3 and input terminal 14.2 and is shown to include a fixed, standard resistor or similar impedance element 10. The output terminals 14.3 and 36 of zero-crossing detector 14.0 are shown connected through another fixed, standard resistor or similar impedance element 22 to the input terminal 28.1 of another amplifier 28.0 (preferably an operational type amplifier such as model 110C manufactured by Analogue Devices of Cambridge, Mass.). The other input terminal, 28.2, of amplifier 28.0 is shown connected to ground potential at 36. It should be here noted that the input terminals 28.1—28.2 of amplifier 28.0 are arranged to be opposite in polarity with respect to the polarity of input terminals 14.1—14.2 of zero-crossing detector 14.0.

Figure 2:
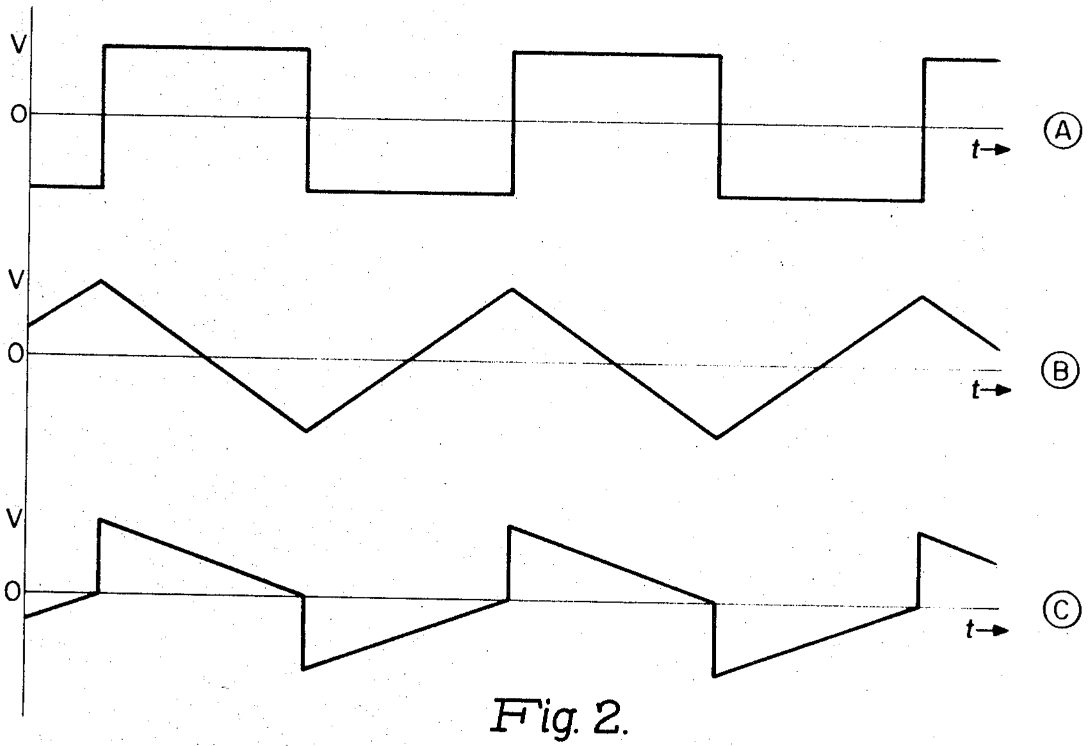
FIG. 2 is a showing of various wave forms at selected points in the circuit diagram of FIG. 1.

Between output terminal 28.3 and input terminal 28.1 of amplifier 28.0 there is provided an energy storing, time constant control element 30 which produces a sawtooth or ramp voltage generator output at terminal 28.3 as indicated in the wave form B of FIG. 2. In the wave form diagrams illustrated in FIG. 2, the axes of abscissa labeled $t$ (time) represent the zero-voltage line in each instance.

A negative feedback path 34 is provided between output terminal 28.3 of sawtooth or ramp generator 28.0 and input terminal 14.1 of zero-crossing detector 14.0 and is shown as containing a fixed, standard reference resistor or other similar impedance element 12. The square wave voltage wave form appearing at the output of detector 14.0 is fed back by means of path 38 and the sawtooth or ramp voltage wave form appearing at the output of ramp generator 28.0 is fed back by means of path 34 both terminating at input terminal 14.1 of zero-crossing detector 14.0 and, when combined, together produce a composite summation waveform at input terminal 14.1 of zero-crossing detector 14.0 as illustrated in wave form C in FIG. 2. Thus, whenever the ramp or sloping portion of wave form C (FIG. 2) reaches or crosses the zero-voltage line, the output signal appearing at terminal 14.3 of zero-crossing detector 14.0 changes from one sense to another so that as the input signal passes through zero the output signal may, for example, change its voltage from a negative sense to a positive sense of the square wave shown at wave form A (FIG. 2) and vice versa. The levels of the wave forms, having preferably though not always essentially symmetrical operation, are shown clamped by network 16.0 consisting of back-to-back, reverse connected diodes 16.0—16.2 connected across the output terminals (14.3 and 36) of zero-crossing detector 14.0. This clamping level is for convenience only as the amplitude of the wave forms do not affect the frequency or the period of oscillation.

Thus far, it has been shown that only the fixed elements 10, 12, 22 and 30 determine the frequency of oscillation. In accordance with the principles of my invention, a sensor element such as, for example, a strain gauge, a conductivity measuring transducer, a thermistor or other similar attenuating devices (herein schematically shown as potentiometer 18) is connected in parallel with network 16 across the output terminals (14.3 and 36) of zero-crossing detector 14.0. The output of sensor 18 is applied as an input directly to terminal 20.1 of amplifier 20.0, the other input terminal thereof, namely, 20.2, being at ground potential by reason of its connection to ground 36. Amplifier 20.0 is preferably a unity gain, isolation amplifier, such as National Semiconductors Model LM202 voltage follower, having an output terminal 20.3 connected to one end of a further fixed, standard resistor or similar impedance element 24. The other end of impedance 24 is connected to the moveable arm 26.1 of switch 26.0 so that the output of amplifier 20.0 may be selectively connected to either terminal 26.2 or terminal 26.3. Terminal 26.2 to which the output terminal 14.3 of zero-crossing detector 14.0 is connected, is directly connected to input terminal 28.1 of the sawtooth or ramp generator 28.0. Feedback path 32 is connected between terminal 26.3 and input terminal 14.1 of zero-crossing detector 14.0. Thus, the output of amplifier 20.0 may be selectively applied to either the input terminal 28.1 of sawtooth or ramp generator 28.0 or, by means path 32, to input terminal 14.1 of zero-crossing detector 14.0. In this arrangement, a portion of the square wave voltage A (FIG. 2) may be applied at any given time, to input terminal 28.1 of the sawtooth or ramp generator 28.0 to render the frequency of the oscillator circuit substantially proportional to the setting or variation appearing across sensor 18. Alternatively, when switch 26.0 is in the position indicated, a portion of the square wave voltage A (FIG. 2) may be applied, at any given time, to input terminal 14.1 to produce the summation wave form C (FIG. 2) at the input of zero-crossing detector 14.0 to render the period of the oscillation generator of the circuit of FIG. 1 substantially proportional to the setting in or the variations of sensor 18.

Greater flexibility is therefore provided by the circuit of the present invention for selectivity and for providing either a frequency or a period measurement directly related to variations appearing on a sensor or other attenuated element.

From a somewhat crude, but helpful, point of view, the proportionalities above-discussed will be more readily apparent if it is realized that the supplemental portion of the square wave voltage applied at terminal 28.1 has the tendency to cause the sawtooth or ramp voltage wave form B (FIG. 2) to rise faster and hence vary the oscillation frequency with the degree of additional square wave voltage. Similarly, the same, additional square wave voltage, applied to input terminal 14.1 from amplifier 20.0, added to composite wave form C (FIG. 2) tends to increase the input current resulting in a longer time lapse in the ramp voltage to overcome the current inserted from the square wave, thereby increasing the period in accordance with any given setting from sensor 18.

While there has been described what is presently considered the preferred embodiment of my invention, it should now be obvious to those skilled in the art that various other changes and modifications may be made therein without departing from the inventive concept contained herein, and it is, therefore, aimed to cover all such changes and modifications that may fall within the true spirit and scope of my invention.

I claim:

1. An oscillator system having, in combination:
- zero-crossing detector means having an input and an output interconnected by a positive feedback path;
- ramp generator means having an input and an output, the input connected to the output of the zero-crossing detector means and the output thereof connected, by means of a negative feedback path, to the input of the zero-crossing detector means; and
- signal attentuating terminal means connected across the output of the zero-crossing detector for selectively connecting the output thereof to the input of the ramp generator means and to the input of the zero-crossing detector means, whereby variations in the signal attenuating means causes the oscillator frequency and period respectively to vary substantially proportionately with such variations.

2. An oscillator system as claimed in claim 1 wherein the signal-attenuating means comprises an electrical sensor device.

3. The oscillator system as claimed in claim 2, further comprising a single frequency determining element connected from the output to the input of the ramp generator means.

4. The oscillator system as claimed in claim 3 wherein the single frequency determining element is an energy storage device.

5. An oscillator system as claimed in claim 4 wherein:
- the positive feedback path, the negative feedback path and the zero-crossing detector means output-to-ramp generator means input connection each contains a series connected reference, standard impedance; and
- the frequency and period of the oscillator being determined by the values of the reference impedances, energy storage device and signal attenuating means substantially exclusively.

6. The oscillator system as claimed in claim 5 further comprising:
- a unity gain amplifier means having an input and an output;
- the input thereof connected to the signal attenuating means; and
- the output thereof selectively connected between the input of the ramp generator means and the input to the zero-crossing detector means.